(12) United States Patent
Starr et al.

(10) Patent No.: US 10,937,144 B2
(45) Date of Patent: Mar. 2, 2021

(54) PIPE FEATURE IDENTIFICATION USING PIPE INSPECTION DATA ANALYSIS

(71) Applicant: RedZone Robotics, Inc., Pittsburgh, PA (US)

(72) Inventors: Justin Starr, Baden, PA (US); Galin Konakchiev, Pittsburgh, PA (US); Foster J Salotti, Verona, PA (US); Mark Jordan, Pittsburgh, PA (US); Nate Alford, North Huntington, PA (US); Thorin Tobiassen, Pittsburgh, PA (US); Todd Kueny, Tarentum, PA (US); Jason Mizgorski, Gibsonia, PA (US)

(73) Assignee: RedZone Robotics, Inc., Pittsburgh, PA (US)

(*) Notice: Subject to any disclaimer, the term of this patent is extended or adjusted under 35 U.S.C. 154(b) by 96 days.

(21) Appl. No.: 16/184,073

(22) Filed: Nov. 8, 2018

(65) Prior Publication Data
US 2019/0139215 A1 May 9, 2019

Related U.S. Application Data

(60) Provisional application No. 62/583,694, filed on Nov. 9, 2017.

(51) Int. Cl.
*G06K 9/00* (2006.01)
*G06T 7/00* (2017.01)
(Continued)

(52) U.S. Cl.
CPC ............. *G06T 7/0004* (2013.01); *G01M 3/38* (2013.01); *G06K 9/6253* (2013.01);
(Continued)

(58) Field of Classification Search
CPC ................ G06K 9/6267; G06T 7/0004; G06T 2207/20081; G06T 2207/20084; G06T 2207/20092; G06T 2207/30108
See application file for complete search history.

(56) References Cited

U.S. PATENT DOCUMENTS 4,974,168 A * 11/1990 Marx ................... G01M 3/005
348/125
5,349,541 A * 9/1994 Alexandro, Jr. ....... G06N 3/105
703/18

(Continued)

FOREIGN PATENT DOCUMENTS

CN 102122351 A 7/2011

OTHER PUBLICATIONS

Classification of Defects in Sewer Pipes Using Neural Networks, Osama Moselhi et al., Journal of Infrastructure systems, Sep. 2000, pp. 97-104 (Year: 2000).*

(Continued)

*Primary Examiner* — Jayesh A Patel
(74) *Attorney, Agent, or Firm* — Cafardi, Ferguson, Wyrick, Weis + Gabriel, LLC; Andrew M. Gabriel (57) ABSTRACT

One aspect provides a method, including: operating a mobile pipe inspection platform to obtain sensor data for the interior of a pipe; analyzing, using a processor, the sensor data using a trained model, where the trained model is trained using a dataset including sensor data of pipe interiors and one or more of: metadata identifying pipe feature locations contained within the sensor data of the dataset and metadata classifying pipe features contained within the sensor data of the dataset; performing one or more of: identifying, using a processor, a pipe feature location within the sensor data; and classifying, using a processor, a pipe feature of the sensor data; and thereafter producing, using a processor, an output (Continued)

including one or more of an indication of the identifying and an indication of the classifying. Other aspects are described and claimed.

15 Claims, 5 Drawing Sheets

(51) Int. Cl.
- *G01M 3/38* (2006.01)
- *G06T 7/73* (2017.01)
- *G06K 9/62* (2006.01)
- *G01M 3/00* (2006.01)

(52) U.S. Cl.
CPC ......... *G06K 9/6257* (2013.01); *G06K 9/6267* (2013.01); *G06T 7/73* (2017.01); *G01M 3/005* (2013.01); *G06K 2209/27* (2013.01); *G06T 2207/20081* (2013.01); *G06T 2207/20084* (2013.01); *G06T 2207/20092* (2013.01); *G06T 2207/30108* (2013.01); *G06T 2207/30184* (2013.01)

(56) References Cited

U.S. PATENT DOCUMENTS

| | | | | |
|---|---|---|---|---|
| 6,014,652 A * | 1/2000 | Hill | ............. | G01B 5/28 706/15 |
| 6,175,380 B1 * | 1/2001 | Van Den Bosch | ... | E21B 47/002 348/84 |
| 7,215,811 B2 * | 5/2007 | Moselhi | ............. | G01N 21/954 382/149 |
| 9,927,354 B1 * | 3/2018 | Starr | ............. | G01S 13/867 |
| 10,115,237 B2 * | 10/2018 | Starr | ............. | G06T 11/00 |
| 2003/0023404 A1 * | 1/2003 | Moselhi | ............. | G06T 7/0004 702/181 |
| 2006/0074525 A1 | 4/2006 | Close | | |
| 2006/0290779 A1 * | 12/2006 | Reverte | ............. | E03F 7/10 348/84 |
| 2008/0105067 A1 * | 5/2008 | Frey | ............. | G01B 11/24 73/865.8 |
| 2011/0023610 A1 | 2/2011 | Ume | | |
| 2011/0168900 A1 * | 7/2011 | Dobbs | ............. | G01N 23/02 250/360.1 |
| 2014/0110167 A1 * | 4/2014 | Goebel | ............. | G06K 9/6292 175/24 |
| 2014/0172374 A1 * | 6/2014 | Brady | ............. | G01N 21/3581 702/189 |
| 2018/0321068 A1 * | 11/2018 | Meribout | ............. | G01F 1/712 |

OTHER PUBLICATIONS

Automated pipe defect detection categorization—Neural Network, O. Duran et al., IEEE, 1545-5955, 2007, pp. 118-126 (Year: 2007).*
Automated diagnosis of sewer pipe defects based on machine learning approaches, Ming-Der Yang et al., Elsevier, 2008, pp. 1327-1337 (Year: 2008).*
Automated detection of surface defects in water and sewer pipes, Osama Moselhi et al., Elsevier, 1999, pp. 581-588 (Year: 1999).*
Automated Sewer Inspection Using Image Processing and a Neural Classifier, Olga Duran et al., IEEE, 0-7803-7278-6/02, 2002, pp. 1126-1131 (Year: 2002).*
PIRAT—A System for Quantitative Sewer Pipe Assessment, Robin Kirkham et al., The international journal of Robotics research, vol. 19. No. 11, Nov. 2000, pp. 1033-1053 (Year: 2000).*
Impact damages detection on composite materials by THz imaging, Fabien Destic et al., Elsevier, 2016, pp. 53-62 (Year: 2016).*
Demonstration of the Applicability of Nondestructive Microwave Testing to the Long-Range Inspection of Inner-Surface Cracks in Tubes, Kota Sasaki et al., Materials Transactions, vol. 58, No. 4, 2017, pp. 692 to 696 (Year: 2017).*
Imaging with TeraHertz Radiation, Wai Lam Chan et al.,IOP publishing, 2007, pp. 1325-1379 (Year: 2007).*
Stand-alone system for high-resolution, real-time terahertz imaging, Maria I Amanti et al., Jan. 30, 2012 , vol. 20, No. 3 / Optics Express 2772, pp. 1-7 (Year: 2012).*
Valdimirova, International Search Report and the Written Opinion of the International Searching Authority, PCT/US2018/059795, dated Mar. 7, 2019, Federal Institute of Industrial Property, Moscow, Russia (8 pages).

* cited by examiner

PIPE FEATURE IDENTIFICATION USING PIPE INSPECTION DATA ANALYSIS

CROSS REFERENCE TO RELATED APPLICATIONS

This application claims priority to U.S. Patent Application Ser. No. 62/583,694, having the same title and filed on Nov. 9, 2017, the contents of which are incorporated by reference in their entirety herein.

FIELD

The subject matter described herein relates to collection and use of sensor data for underground infrastructure such as a pipe or pipe network, and specifically relates to pipe feature identification and/or classification using computer vision or image analysis techniques.

BACKGROUND

Underground infrastructure such as pipe networks for municipalities that carry potable water, waste water, etc., need to be inspected and maintained. Pipes are often inspected as a matter of routine upkeep or in response to a noticed issue.

Various systems and methods exist to gather pipe inspection data. For example, pipe inspection data may be obtained by using closed circuit television (CCTV) cameras or using a mobile pipe inspection robot. For example, a mobile pipe inspection platform traverses through the interior of a pipe and obtains sensor data regarding the interior of the pipe, e.g., visual image data and other sensor data for visualizing pipe features such as pipe defects, root intrusions, etc. Typically, an inspection crew is deployed to a location and individual pipe segments are inspected, often individually in a serial fashion, in order to collect pipe data and analyze it.

BRIEF SUMMARY

In summary, one aspect provides a method, comprising: operating a mobile pipe inspection platform to obtain sensor data for the interior of a pipe; analyzing, using a processor, the sensor data using a trained model, wherein the trained model is trained using a dataset including sensor data of pipe interiors and one or more of: metadata identifying pipe feature locations contained within the sensor data of the dataset and metadata classifying pipe features contained within the sensor data of the dataset; performing one or more of: identifying, using a processor, a pipe feature location within the sensor data; and classifying, using a processor, a pipe feature of the sensor data; and thereafter producing, using a processor, an output including one or more of an indication of the identifying and an indication of the classifying.

Another aspect provides a system, comprising: a mobile pipe inspection platform that comprises one or more sensors that obtain sensor data for the interior of a pipe; and a computer system operatively coupled to the mobile pipe inspection platform and configured to: analyze the sensor data using a trained model, wherein the trained model is trained using a dataset including sensor data of pipe interiors and one or more of: metadata identifying pipe feature locations contained within the sensor data of the dataset and metadata classifying pipe features contained within the sensor data of the dataset; perform one or more of: identify a pipe feature location within the sensor data; and classify a pipe feature of the sensor data; and thereafter produce an output including an indication of the pipe feature.

A further aspect provides a product, comprising: a non-transitory storage device that stores code that is executable by a processor, the code comprising: code that analyzes sensor data obtained from a mobile pipe inspection platform using a trained model, wherein the trained model is trained using a dataset including sensor data of pipe interiors and one or more of: metadata identifying pipe feature locations contained within the sensor data of the dataset and metadata classifying pipe features contained within the sensor data of the dataset; code that performs one or more of: identifying a pipe feature location within the sensor data; and classifying a pipe feature of the sensor data; and code that thereafter produces an output including an indication of the pipe feature.

The foregoing is a summary and is not intended to be in any way limiting. For a better understanding of the example embodiments, reference can be made to the detailed description and the drawings. The scope of the invention is defined by the claims.

BRIEF DESCRIPTION OF THE SEVERAL VIEWS OF THE DRAWINGS

FIG. 1(A-B) illustrates example images and pipe feature detection according to an embodiment.

FIG. 2(A-B) illustrates example images and pipe feature classification according to an embodiment.

DETAILED DESCRIPTION

It will be readily understood that the components of the embodiments, as generally described and illustrated in the figures herein, may be arranged and designed in a wide variety of ways in addition to the examples described herein. The detailed description uses examples, represented in the figures, but these examples are not intended to limit the scope of the claims.

Reference throughout this specification to "embodiment(s)" (or the like) means that a particular described feature or characteristic is included in that example. This particular feature or characteristic may or may not be claimed. This particular feature may or may not be relevant to other embodiments. For the purpose of this detailed description, each example might be separable from or combined with another example, i.e., one example is not necessarily relevant to other examples.

Therefore, the described features or characteristics of the examples generally may be combined in any suitable manner, although this is not required. In the detailed description, numerous specific details are provided to give a thorough understanding of example embodiments. One skilled in the relevant art will recognize, however, that the claims can be practiced without one or more of the specific details found in the detailed description, or the claims can be practiced with other methods, components, etc. In other instances, well-known details are not shown or described in detail to avoid obfuscation.

Sensor data (e.g., still image data, video data, laser, sound or terahertz sensor data formed into a scan or other image, etc., collectively "sensor data") captured by one or more sensors of a pipe inspection robot, such as visible light cameras or other sensors, may be viewed by a user to identify pipe features such as pipe defects located inside of a pipe (e.g., cracks, root intrusion, sediment buildup, pipe wall erosion, etc.). In addition to controlling the movement of the pipe inspection robot, users are capable of remotely controlling the sensors (e.g., by utilizing pan and tilt functions, etc.) to look around and attain different visual perspectives of the pipe. The captured sensor data may be viewed on a display screen by a user located at a remote location.

Conventionally, when observing pipe inspection data displayed on a screen, users may estimate the identity a potential defect or pipe feature that the user sees in the sensor data, displayed on the screen in the form of an image. This is often done by an experienced technician, with knowledge of the pipe type and history, and the technician estimates the location and identity (e.g., type) of the pipe feature. For example, on a display screen a crack in a pipe may appear and a user can manually annotate this pipe feature. However, since there are a variety of pipe features, the user must estimate the identities of various types of defects/features for a pipe. Depending on the experience of the users viewing the sensor data, the estimation may be relatively accurate or may be inaccurate. Experienced users may have familiarity with particular pipes and their corresponding dimensions, common objects found in those pipes, common defects associated with the pipes, and the like. However, due to the abundance of different pipe types, pipe sizes, potential defects associated with those pipes, and the like, even experienced users may be unable to provide accurate estimations regarding the identity of particular visualized pipe features. Moreover, there is often a vast amount of pipe inspection data, making manual review and annotation of pipe features time consuming and costly.

Accordingly, an embodiment provides for the collection and use of sensor data for underground infrastructure assets such as a pipe network using a mobile pipe inspection platform, e.g., a tracked robot, a sled inspection platform, etc. The sensor data obtained by sensors of such pipe inspection platforms is subject to automated computer vision or image analysis, e.g., analysis of image features from visual images or synthetic/constructed images such as images formed using laser scan data, acoustic data, terahertz image data, or a combination of the foregoing.

In an embodiment, an automated pipe feature detection or identification process is provided by analyzing the sensor data for the interior of the pipe. In this disclosure, sensor data includes visual image data as well as other sensor data, for example that is formed into an image. In an embodiment, machine learning, for example as provided by a neural network or other object identification technique, may be used to detect (locate) potential pipe feature(s) in the sensor data and/or to classify (identify) pipe features of the sensor data. In an embodiment, object(s) detected in sensor data reported by a pipe inspection platform may be automatically classified or labelled using an automated technique, for example using a neural network that is trained to identify specific pipe features. Further, an embodiment may make a material identification of the pipe feature(s) in some cases, e.g., distinguish between a crack in pipe formed of cement and rebar, identification of exposed rebar, identification of root intrusion versus sediment buildup, etc. In some cases, additional sensor data, e.g., laser scan data, terahertz image data, etc., may be utilized in addition to visual image data.

The description now turns to the figures. The illustrated example embodiments will be best understood by reference to the figures. The following description is intended only by way of example and simply illustrates certain selected example embodiments.

Figure 1A:
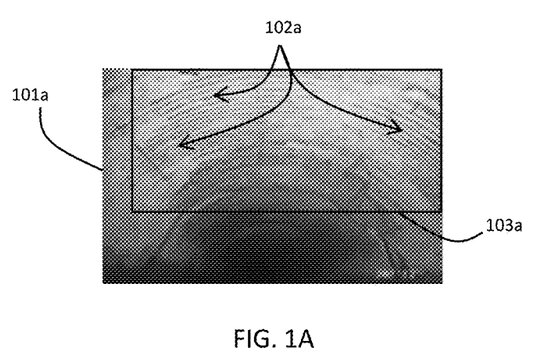
Figure 1B:
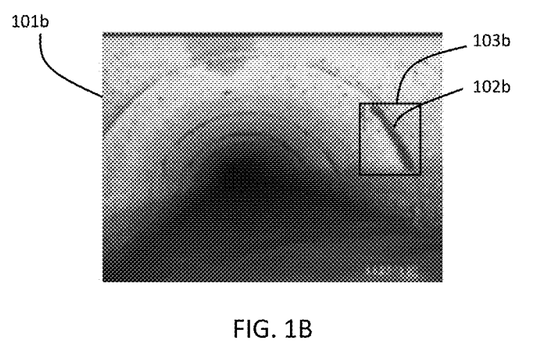

Referring now to FIG. 1(A-B), example images and pipe feature detection according to an embodiment are illustrated. In the image 101a of FIG. 1A, an interior of a pipe is shown in which a pipe feature 102a of interest appears. The pipe feature 102a of image 101a is exposed rebar in the interior of the pipe wall. This pipe feature 102a indicates that the interior of the pipe wall has eroded to a significant degree. As such, if visualized by an experienced technician, this pipe feature 102a may be located and annotated for follow up inspection, repair, etc.

An embodiment provides automated image analysis techniques that detect pipe features, such as pipe feature 102a. For example, in an initial phase, an embodiment may detect that an object of interest is located in an area of the image 103a. In the example of image 101a, the pipe feature 102a is located within the area 103a, and an embodiment may automatically identify this area 103a with a bounding box, as illustrated in FIG. 1A.

Further, an embodiment may automatically classify the pipe feature 102a, e.g., for labeling or annotating the feature automatically, rather than relying on a technician to manually annotate the feature. For example, an embodiment may subject the image 101a, or a portion thereof, e.g., area 103a, to further analysis in order to classify the pipe feature 102a, e.g., as opposed to another pipe feature.

Turning to FIG. 1B, another image 101b is illustrated, and again a pipe feature 102b is detected within the interior of the pipe. Here, the pipe feature 102b is a crack located in the pipe wall where a natural seam is located. As shown, an embodiment may analyze the image to automatically detect feature 102b as a feature of interest, and provide a bounding box 103b indicating the location of the feature 102b. Again, an embodiment may perform additional analysis of the pipe feature 102b, e.g., in order to distinguish it from another type pipe feature, e.g., pipe feature 102a.

Figure 2A:
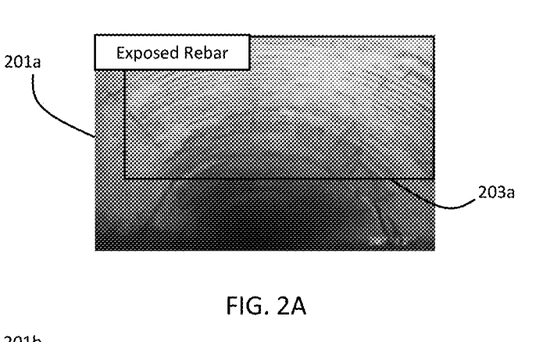
Figure 2B:
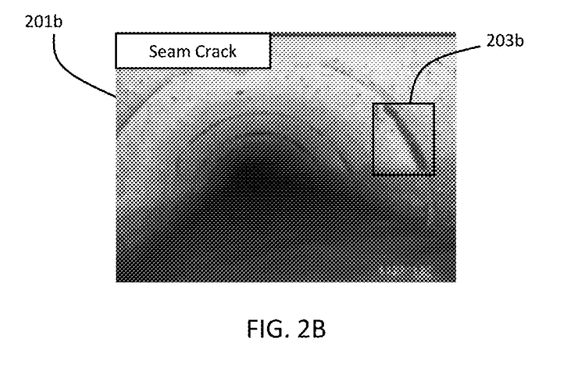

Turning to FIG. 2(A-B), an embodiment facilitates the automated detection and annotation or labeling of the pipe features of images 201a and 201b. By way of example, an embodiment may use an image classification process to automatically classify the images as containing features of a particular type. In an embodiment, the image classification may be conducted by a neural network that is trained using reference data, for example images of a pipe interior that are annotated manually in order to train the neural network. Thus, an embodiment may utilize a neural network to operate on an input image, e.g., image 201a or image 201b, in order to distinguish pipe features 102a or 102b, from one another (and other features). Thus, an embodiment may provide an output in which an image of the pipe interior, e.g., image 201a, 201b, is provided with a label or annotation such as "Exposed Rebar" or "Seam Crack," along with a bounding box or other indication of a location of the pipe feature that generated the labelling or annotation.

Figure 3:
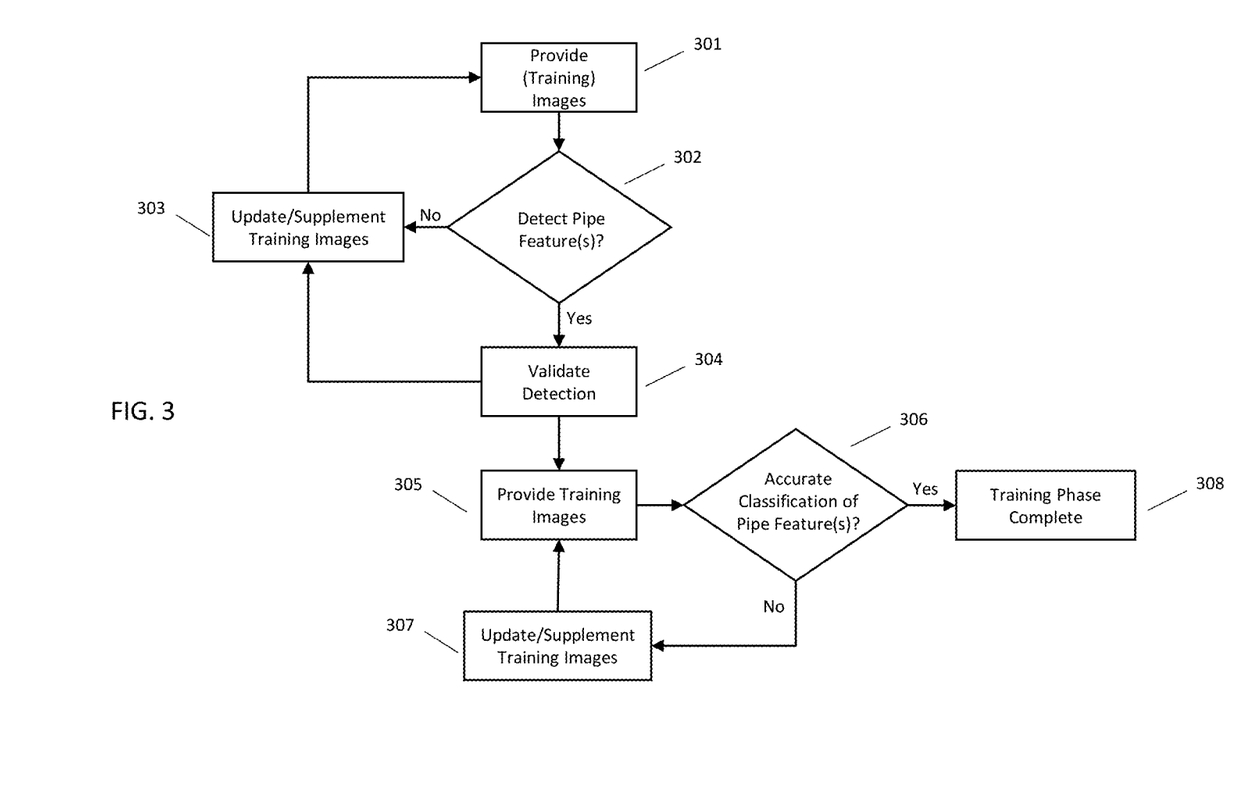
FIG. 3 illustrates an example method of training a system for automatic pipe feature detection and classification according to an embodiment.

FIG. 3 illustrates an example method of training a system for automatic pipe feature detection and classification according to an embodiment. An embodiment provides pipe feature detection that allows training of neural networks to detect pipe features (such as cracks in a pipe wall, root intrusions, pipe erosion features such as exposed rebar, and the like) in images (inclusive of other sensor data) and indicate, e.g., define bounding boxes around, these pipe feature(s) automatically. An embodiment may utilize a customized or partially customized neural network for identifying the pipe features. For example, an existing model architecture may be used, such as DetectNet object detection architecture from nVidia.

At 301, training images are provided to the system, e.g., visual images of a pipe interior that have one or more pipe features of interest. By way of example, for detection of pipe features, training images may include images that contain one or more pipe feature, e.g., a crack and/or exposed rebar, along with metadata for each of the pipe feature(s). In the training images provided at 301, for example, the metadata may include an object classification (e.g., type, such as crack, root intrusion, sediment buildup, exposed rebar, etc.) and the location of the object within the image, e.g., pixel coordinates of the pipe feature(s) or of bounding boxes that contain the pipe feature(s).

The training images provided at 301 permit an embodiment to train a neural network to recognize pipe feature(s) of interest within the images, e.g., pipe features 102a, 102b illustrated in FIG. 1(A-B). By way of specific example, in the case of a DetectNet type model, a grid is formed for the image and a determination is made as to whether each grid contains a pipe feature of interest. This grid approach permits the provision of a rectangular bounding box around the pipe feature, as illustrated in FIG. 1(A-B) and FIG. 2(A-B). This of course is a non-limiting example, and rectangular or grid based detection need not be utilized.

By way of further example, steps 301 and 302 may be part of a supervised computer vision learning process where defined input and output pairs are provided as the training images. For example, using the DetectNet technique, input and output pairs of images and rectangular bounding boxes of training data are provided at 301 to train an algorithm to learn predictions on subsequent input, e.g., new pipe interior images collected with a pipe inspection platform. For identifying pipe features within pipe interior image, e.g., image 101a, 101b of FIG. 1(A-B), using bounding boxes determined by a neural network, training images provided at 301 might include a number of images and data files indicating coordinates for the pipe feature location(s) in that image.

The output of this process, as illustrated at 302, is a determination of detected pipe feature(s) within the images, e.g., pipe feature(s) is/are being detected or not being detected, for example as judged by a comparison to known feature data of the training images or by visualizing a visible indication, e.g., a bounding box, etc. If pipe features are detected, as determined at 302, these may be validated as part of the training process, as illustrated at 304. For example, validation at 304 may include manual review and confirmation of pipe feature detection and/or bounding box locations within the training images. This may be an automated or manual process, or both. For example, an algorithm may compute if an identified bounding box for a pipe feature matches a known location of the pipe feature in a test image. If pipe features are not being detected, or not being detected properly, as determined at 302 and/or 304, update(s) or changes to the training images and/or the model (e.g., neural network) used to detect pipe feature(s) may be made. This permits iterative analysis of training data and improvement in the precision and/or accuracy of automated pipe feature detection.

It should be noted that the exact type of classification used for identifying pipe features and/or classifying or labeling the pipe feature types is not limited to the examples described in this specification. However, the type of model may influence the accuracy or usefulness of the automated image processing. That is, a deep learning neural network model, such as GoogLeNet or DetectNet, may be preferable over a feature-based technique (e.g., manually engineered features for each region of an image of interest and training of a classifier). However, depending on the application, such feature based classifiers or other techniques may be acceptable or preferred, e.g., due to limited computing resources being available, less accuracy being required, etc.

In addition to pipe feature detection and indication (e.g., with a bounding box), or in lieu of such pipe feature detection and indication, an embodiment may classify or label images, e.g., with a pipe feature identification or label. This pipe feature classification or labelling may be applied at the image level (e.g., image is determined to include one or more pipe features) or at the pipe feature level (e.g., a bounded pipe feature is determined to be a particular type or types). As shown in FIG. 3, an embodiment may further or alternatively be provided with training data for classifying images or detected pipe features within the images.

This process may begin with a training phase, as for example by the provision of training images as illustrated at 305. Similar to pipe feature detection, illustrated at 302, an embodiment may determine if pipe features are being accurately classified at 306. For example, a training image provided at 305 may include an input image of a known pipe feature as well as meta data identifying or classifying the image as containing that particular feature. Moreover, the training image provided at 305 may include an image sub-part, e.g., part of an image including a detected object located at 302, and a correct classification type for that object, e.g., pipe feature type, material, etc.

At 306, the classification model is evaluated, which again may include a neural network or other classifier, and an embodiment can continue to train the model, e.g., as illustrated at 307, until the classification model is performing classification at an adequate level for the application(s) in question. Once this occurs, the training phase may be completed, as illustrated at 308. Again, the particular type of machine learning model to be used for classification may be selected using a variety of factors, e.g., a desired accuracy, an available amount of processing power, etc.

Figure 4:
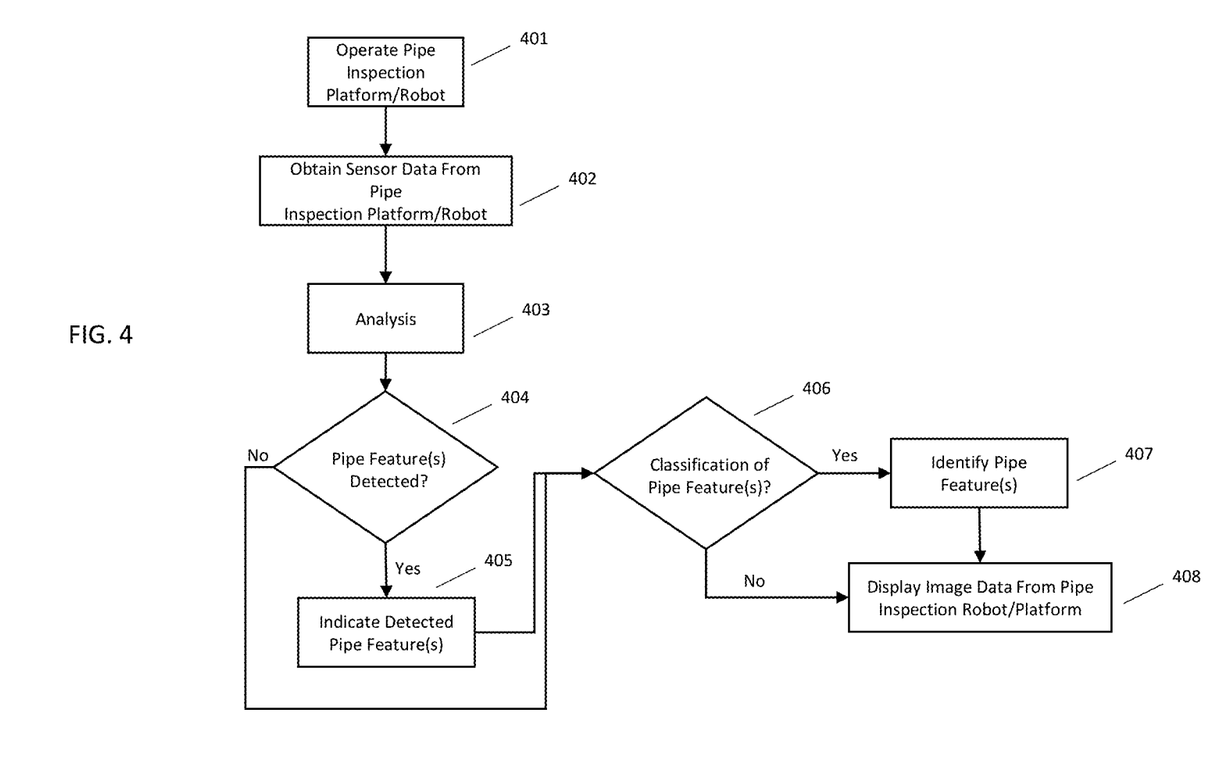
FIG. 4 illustrates an example method of pipe feature identification and classification according to an embodiment.

Referring to FIG. 4, illustrated is an example method of pipe feature detection and classification according to an embodiment. As illustrated, at 401 a pipe inspection platform is operated. The pipe inspection platform may include an autonomous mobile pipe inspection robot, a sled type arrangement or any other inspection platform that permits retrieval of sensor data, broadly understood to include visual image data, as well as other data types collected from a variety of sensors. The sensor data is obtained from the pipe inspection platform at 402, e.g., visual images or other sensor data is stored in memory, for example of a pipe inspection robot or in the memory of a remote device that is operatively coupled to the pipe inspection platform.

Thereafter, in the example case of visual images, the images are subjected to an automated analysis process at 403. For example, object detection and/or classification is performed, e.g., using a neural network or other classifier, to detect pipe features and/or to classify or label the pipe features or images. The analysis performed at step 403 may include object detection, object classification, or both. The analysis performed at 403 may be conducted locally, i.e., on the pipe inspection platform, or remotely, e.g., after sensor data is transmitted to a cloud device or remote server.

In one example analysis, it is determined at 404 if pipe feature(s) are detected. If so, e.g., a seam crack or exposed rebar is identified as an object within the image, an embodiment may indicate the pipe feature(s), e.g., draw a bounding box around the pipe feature, as for example illustrated at 405. Irrespective if any such pipe feature is detected, or even if a location of the pipe feature cannot be determined with adequate accuracy, an embodiment may classify the images as containing pipe feature(s), as illustrated at 406. Of course, if one or more pipe features are detected at 404, these may also be subject to classification at 406.

At 406, an embodiment performs an automated classification of the images and/or the objects detected in order to classify the pipe feature(s) contained in the image data (or other sensor data). For example, for a pipe feature detected at 404, image data associated with that object may be supplied to a model or classifier to classify the pipe feature as a particular type. Likewise, for an image for which an embodiment did not detect a pipe feature (whether or not object detection was attempted), the image may be subjected to a model or classifier trained to classify image data in order to attempt a classification of the image as containing a pipe feature of a particular type. In some cases, a user may manually annotate or identify a pipe feature or region of interest prior to subjecting the image data to classification at 406.

If one or more pipe features are classified, the pipe feature(s) are identified at 407. For example, a visual indication may be provided with a label listing the type(s) of pipe features detected. In an embodiment, such labels or annotations may be visually associated with locations of the detected pipe feature, as for example illustrated in FIG. 2(A-B). As illustrated in FIG. 4, image data may be displayed for a user to review. For example, an image may be displayed without any labelling (e.g., labelling data as illustrated in FIG. 2(A-B). In contrast, for images in which pipe features are detected and/or classified, an image may be displayed with labeling data (again as illustrated in FIG. 2(A-B)).

Therefore, an embodiment facilitates automated analysis of pipe inspection data, and includes a capability to detect pipe features, for example providing a visual such as a bounding box around the feature. Further, an embodiment provides for an automated image analysis in the form of classification, and thus can provide an output in which pipe feature(s) are annotated or labelled in the image. This improves the process of reviewing pipe inspection data by applying an automated analysis to the pipe inspection data. This may, for example, serve as a first pass that flags certain parts of expansive pipe inspection data for further human review, flags certain parts of a pipe network, e.g., by correlating pipe inspection data with a physical pipe or pipe segment, for further analysis, repair, etc. Thus, a user may be provided with a visual highlighting area(s) of a pipe network that contain a certain type of feature, e.g., wall erosion of more than 50% and having exposed rebar visible, and the user may be able to display images of the features with annotations, e.g., by clicking on a highlighted graphic within the pipe network illustration to display an image such as illustrated in FIG. 2A.

It should be noted that an embodiment may utilize a variety of image data and sensor data types in performing the automated analyses illustrated by way of example in FIG. 4. This sensor data may be utilized alone or in some combination. For example, a pipe feature detection and/or classification process may be performed for two or more image types, e.g., visual images and terahertz images, for the same pipe area. This may improve the accuracy of pipe feature detection and/or pipe feature classification. For example, a visual image of a pipe feature such as exposed rebar may be detected and classified by a neural network with a 50% confidence level. However, analysis of a terahertz image of that same pipe location may detect and classify an image as containing exposed metal associated with rebar, again at a 50% confidence level. Taken together, this may increase the confidence of the overall classification, i.e., a section of pipe includes wall erosion and exhibits exposed rebar.

Similarly, certain types of sensor data, e.g., terahertz data, may be combined to permit an embodiment to perform material identification, alone or in some combination with analysis of other sensor data. Again, by way of example, an embodiment may first identify a pipe feature location within a visual image, e.g., exposed rebar, which is visually identified with a bounding box. Further, an embodiment may thereafter analyze a terahertz image of the same area of the pipe interior to identify material(s) associated with the feature, e.g., cement, oxidized metal, etc. Similar analyses may be performed for other feature types using other sensor data types, alone or in some combination.

Figure 5:
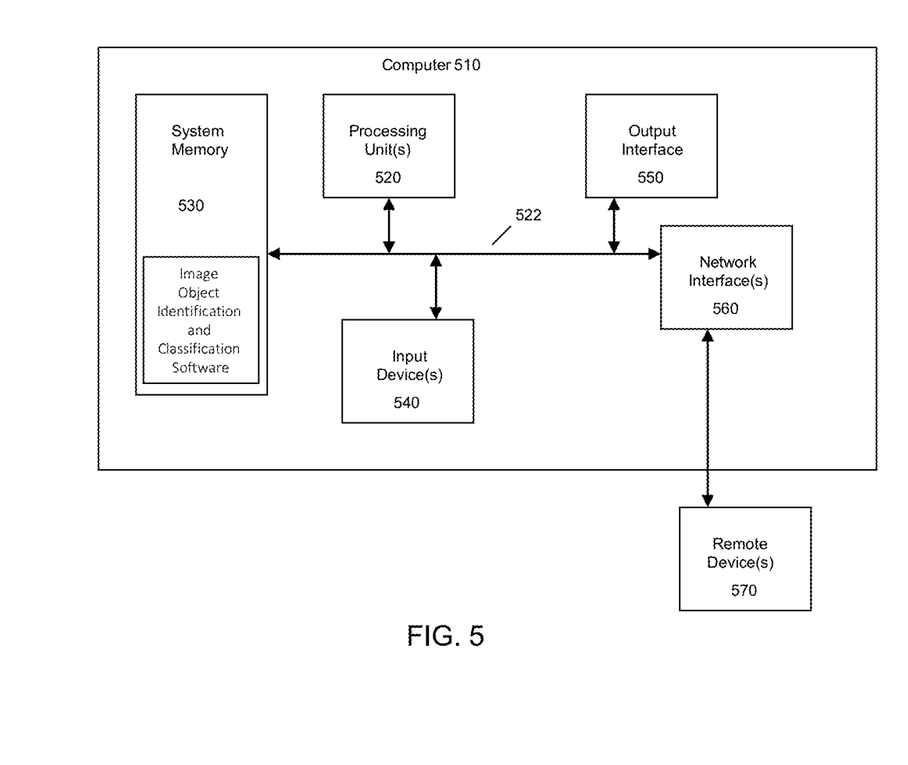
FIG. 5 illustrates an example computing device according to an embodiment.

It will be readily understood that certain embodiments can be implemented using any of a wide variety of devices or combinations of devices. Referring to FIG. 5, an example device that may be used in implementing one or more embodiments includes a computing device (computer) 510, for example included in a pipe inspection platform and/or another computer system, e.g., remote server or cloud computing device.

The computer 510 may execute program instructions or code configured to store and analyze sensor data and perform other functionality of the embodiments, as described herein. Components of computer 510 may include, but are not limited to, a processing unit 520, a system memory 530, and a system bus 522 that couples various system components including the system memory 530 to the processing unit 520. The computer 510 may include or have access to a variety of non-transitory computer readable media. The system memory 530 may include non-transitory computer readable storage media in the form of volatile and/or non-volatile memory devices such as read only memory (ROM) and/or random access memory (RAM). By way of example, and not limitation, system memory 530 may also include an operating system, application programs, other program modules, and program data. For example, system memory 530 may include application programs such as image object identification and classification software and/or sensor operational software. Data may be transmitted by wired or wireless communication, e.g., from one computing device to another computing device.

A user can interface with (for example, enter commands and information) the computer 510 through input devices 540 such as a touch screen, keypad, etc. A monitor or other type of display screen or device can also be connected to the system bus 522 via an interface, such as interface 550. The computer 510 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using processor executable instructions stored on a non-transitory storage medium or device. A non-transitory storage device may be, for example, an electronic, electromagnetic, or semiconductor system, apparatus, or device, or any suitable combination of the foregoing. More specific examples of a non-transitory storage medium include the following: a portable computer diskette, a hard disk, a random-access memory (RAM), a read-only memory (ROM), an erasable programmable read-only memory (EPROM or Flash memory), a portable compact disc read-only memory (CD-ROM), or any suitable combination of the foregoing. In the context of this document "non-transitory" includes all media except non-statutory signal media.

Program code embodied on a non-transitory storage medium may be transmitted using any appropriate medium, including but not limited to wireless, wireline, optical fiber cable, RF, etc., or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   operating a mobile pipe inspection platform to obtain sensor data for the interior of a pipe, wherein the sensor data comprises image data obtained using a camera and additional pipe inspection data obtained using one or more other sensors;
   analyzing, using a processor, the sensor data using a trained model, wherein the trained model is trained using a dataset including sensor data of pipe interiors, metadata identifying pipe feature locations contained within the sensor data of the dataset and metadata classifying pipe features contained within the sensor data of the dataset;
   identifying, using the processor, a pipe feature location within the sensor data;
   classifying, using the processor, a pipe feature of the sensor data;
   wherein the classifying comprises:
      associating a classification result for the image data with a classification result for terahertz image data; and
      thereafter providing a material identification of the pipe feature;
   combining analysis of the additional pipe inspection data with analysis of the image data; and
   thereafter producing, using the processor, an output including an indication of the pipe feature, wherein the pipe feature is one or more of: a crack in a pipe wall, erosion in a pipe wall, sediment buildup in a pipe wall, and an intrusion through a pipe wall.

2. The method of claim 1, wherein the analyzing comprises automated object detection using the sensor data.

3. The method of claim 1, wherein the analyzing comprising receiving user input to select a pipe feature.

4. The method of claim 1, wherein the trained model comprises a trained neural network.

5. The method of claim 4, wherein the trained neural network comprises a neural network trained using reference visual images with annotated pipe features or pipe feature locations.

6. The method of claim 5, wherein the annotated pipe features are annotated by a human operator.

7. The method of claim 1, wherein the additional pipe inspection data comprises one or more of laser pipe inspection data, sonar pipe inspection data, infrared pipe inspection data, and terahertz pipe inspection data.

8. A system, comprising:
   a mobile pipe inspection platform that comprises one or more sensors to obtain sensor data for the interior of a pipe, wherein the sensor data comprises image data obtained using a camera and additional pipe inspection data obtained using one or more other sensors;
   a computer system operatively coupled to the mobile pipe inspection platform and configured to:
      analyze the sensor data using a trained model, wherein the trained model is trained using a dataset including sensor data of pipe interiors, metadata identifying pipe feature locations contained within the sensor data of the dataset and metadata classifying pipe features contained within the sensor data of the dataset;
      identify a pipe feature location within the sensor data; and
      classify a pipe feature of the sensor data;
         wherein to classify comprises:
            associating a classification result for the image data with a classification result for terahertz image data; and
            thereafter providing a material identification of the pipe feature;
      combine analysis of the additional pipe inspection data with analysis of the image data; and thereafter produce an output including an indication of the pipe feature, wherein the pipe feature is one or more of: a crack in a pipe wall, erosion in a pipe wall, sediment buildup in a pipe wall, and an intrusion through a pipe wall.

9. The system of claim 8, wherein the analysis of the sensor data comprises automated object identification using the sensor data.

10. The system of claim 8, wherein the analysis of the sensor data comprises receiving user input to select a pipe feature.

11. The system of claim 8, wherein the trained model comprises a trained neural network.

12. The system of claim 11, wherein the trained neural network comprises a neural network trained using reference visual images with annotated pipe features or pipe feature locations.

13. The system of claim 12, wherein the annotated pipe features are annotated by a human operator.

14. The system of claim 8, wherein the additional pipe inspection data comprises one or more of laser pipe inspection data, sonar pipe inspection data, infrared pipe inspection data, and terahertz pipe inspection data.

15. A product, comprising:
  a non-transitory storage device that stores code that is executable by a processor, the code comprising:
  code that analyzes sensor data obtained from a mobile pipe inspection platform, wherein the sensor data comprises image data obtained using a camera and additional pipe inspection data obtained using one or more other sensors, using a trained model, where the trained model is trained using a dataset including sensor data of pipe interiors, metadata identifying pipe feature locations contained within the sensor data of the dataset and metadata classifying pipe features contained within the sensor data of the dataset;
  code that performs:
    identifying a pipe feature location within the sensor data; and
    classifying a pipe feature of the sensor data;
    wherein the classifying comprises:
      associating a classification result for the image data with a classification result for terahertz image data; and
      thereafter providing a material identification of the pipe feature;
  code that combines analysis of the additional pipe inspection data with analysis of the image data; and
  code that thereafter produces an output including an indication of the pipe feature, wherein the pipe feature is one or more of: a crack in a pipe wall, erosion in a pipe wall, sediment buildup in a pipe wall, and an intrusion through a pipe wall.

* * * * *